United States Patent

Kohno et al.

[11] Patent Number: 6,002,529
[45] Date of Patent: *Dec. 14, 1999

[54] ZOOM LENS SYSTEM

[75] Inventors: Tetsuo Kohno, Toyonaka; Takashi Okada, Osaka, both of Japan

[73] Assignee: Minolta Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/694,540

[22] Filed: Aug. 9, 1996

Related U.S. Application Data

[63] Continuation-in-part of application No. 08/209,825, Mar. 11, 1994, abandoned.

[30] Foreign Application Priority Data

Mar. 16, 1993 [JP] Japan ...................................... 5-56053

[51] Int. Cl.$^6$ .................................................. G02B 15/14
[52] U.S. Cl. .......................................... 359/686; 359/708
[58] Field of Search ...................................... 359/686, 676, 359/713, 714, 715, 773, 683, 708

[56] References Cited

U.S. PATENT DOCUMENTS

| | | | |
|---|---|---|---|
| 4,666,257 | 5/1987 | Tanaka et al. | 359/686 |
| 4,776,680 | 10/1988 | Tanaka | 359/684 |
| 5,086,356 | 2/1992 | Kojima et al. | 359/708 |
| 5,105,311 | 4/1992 | Tokumaru et al. | 359/686 |
| 5,196,962 | 3/1993 | Aoki | 359/686 |
| 5,272,566 | 12/1993 | Aoki | 359/686 |
| 5,299,064 | 3/1994 | Hamano et al. | 359/683 |
| 5,414,562 | 5/1995 | Ueda | 359/683 |
| 5,543,970 | 8/1996 | Hata et al. | 359/714 |

FOREIGN PATENT DOCUMENTS

| | | |
|---|---|---|
| 1179116 | 7/1989 | Japan . |
| 1179903 | 7/1989 | Japan . |
| 339920 | 2/1991 | Japan . |
| 3208004 | 9/1991 | Japan . |
| 3249614 | 11/1991 | Japan . |
| 4338910 | 11/1992 | Japan . |

*Primary Examiner*—Georgia Epps
*Assistant Examiner*—Jordan M. Schwartz
*Attorney, Agent, or Firm*—Price, Gess & Ubell

[57] ABSTRACT

A zoom lens system for use in a compact lens shutter camera has excellent optical properties at a high zoom ratio of 4–5 across the entire zoom range with a small number of lenses. The zoom lens system has, from the object side to the image side, a positive first lens unit, a negative second lens unit, a positive third lens unit and a negative fourth lens unit, wherein the air spaces between each lens unit vary during a zooming operation. The zoom lens system fulfills predetermined conditions related to the back focal distance, the shifting amount of the second and third lens units during zooming and the thickness of the third lens unit.

11 Claims, 3 Drawing Sheets

FIG. 3A
FNO= 4.1
— d
--- SC
-0.5   0.5
SPHERICAL ABERRATION

FIG. 3B
Y'= 21.6
--- DM
— DS
-0.5   0.5
ASTIGMATISM

FIG. 3C
Y'= 21.6
-5.0   5.0
DISTORTION

FIG. 4A
FNO= 6.5
— d
--- SC
-0.5   0.5
SPHERICAL ABERRATION

FIG. 4B
Y'= 21.6
--- DM
— DS
-0.5   0.5
ASTIGMATISM

FIG. 4C
Y'= 21.6
-5.0   5.0
DISTORTION

FIG. 5A
FNO= 9.1
— d
--- SC
-0.5   0.5
SPHERICAL ABERRATION

FIG. 5B
Y'= 21.6
--- DM
— DS
-0.5   0.5
ASTIGMATISM

FIG. 5C
Y'= 21.6
-5.0   5.0
DISTORTION

FIG. 6A
FNO= 4.12

-0.5  0.5
SPHERICAL ABERRATION
— d
---- SC

FIG. 6B
Y'= 21.6

-0.5  0.5
ASTIGMATISM
---- DM
— DS

FIG. 6C
Y'= 21.6

-5.0  5.0
DISTORTION

FIG. 7A
FNO = 7.0

-0.5  0.5
SPHERICAL ABERRATION
— d
---- SC

FIG. 7B
Y'= 21.6

-0.5  0.5
ASTIGMATISM
---- DM
— DS

FIG. 7C
Y'= 21.6

-5.0  5.0
DISTORTION

FIG. 8A
FNO = 8.7

-0.5  0.5
SPHERICAL ABERRATION
— d
---- SC

FIG. 8B
Y'= 21.6

-0.5  0.5
ASTIGMATISM
---- DM
— DS

FIG. 8C
Y'= 21.6

-5.0  5.0
DISTORTION

ZOOM LENS SYSTEM

RELATED APPLICATIONS

This is a continuation-in-part application of U.S. patent application Ser. No. 08/209,825 filed on Mar. 11, 1994 now abandoned.

BACKGROUND OF THE INVENTION

The present invention relates to a zoom lens, and more specifically relates to a zoom lens for use in lens shutter cameras of a built-in zoom lens type.

DESCRIPTION OF THE RELATED ART

In lens shutter cameras of the built-in zoom lens type, a compact and inexpensive photographic lens is required in order to achieve a compact, inexpensive system. On the other hand, the specifications required of a photographic lens are higher, in particular because an extended local length is necessary for the telephoto condition.

The high zoom ratio zoom lens used for lens shutter cameras typically comprise three lens groups, i.e., sequentially from the object side a positive refractive power first lens unit, positive refractive power second lens unit, and negative refractive power third lens unit, which accomplish zooming by changing the spacing between the respective lens groups (e.g., Laid-Open Japanese Patent Application No. Hei 1-204013). When the focal length of the aforesaid zoom lens is lengthened to the telephoto condition, the optical unit becomes extremely large in scale, because the shifting amount of each lens group is quite large with each zoom and the overall length is large under the telephoto condition, such that the compactness required of lenses in cameras of the lens shutter type cannot be achieved.

Another type of zoom lens is proposed in Laid-Open Japanese Patent Application No. Hei 1-252915 which comprises four lens groups divided into the aforesaid second lens unit is negative, with two positive sub units, i.e., sequentially from the object side are a positive refractive power first lens unit, negative refractive power second lens unit, positive refractive power fourth lens unit. The shifting amount is slight with every zoom operation in the aforesaid zoom lenses, but the number of lenses is extremely large, such that the low cost required of lenses for cameras of the lens shutter type cannot be achieved.

SUMMARY OF THE INVENTION

An object of the present invention is to provide a compact zoom lens for cameras of a lens shutter type constructed with a small number of lenses and having excellent optical functionality throughout the entire zoom range at a zoom ratio of 4 to 5.

The present invention achieves the aforesaid objects by providing a zoom lens comprising sequentially from the object side a first lens unit having positive refractive power, a second lens unit having negative refractive power, a third lens unit having positive refractive power, and a fourth lens unit having negative refractive power wherein zooming is accomplished by varying the spacing between said lens units, said zoom lens being characterized by:

(1) the back focal distance in the shortest focal length condition, the ratio of shifting amount between the second and third lens units during zooming, and the thickness in the direction of the optical axis of the third lens unit are suitably prescribed;

(2) aspherical surfaces are provided on both second and third lens units;

(3) the second lens unit consists of a positive lens element and a negative lens element, said second lens unit is provided with an aspherical surface, and the focal distances of said lens units are suitably prescribed;

(4) the third lens unit consists of a positive lens element and a negative lens element, said third lens unit is provided with an aspherical surface, and the focal distances of said lens units are suitably prescribed;

and whereby the zoom lens of the present invention achieves a high zoom ratio with a small number of lenses.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in conjunction with the accompanying drawings.

DETAILED DESCRIPTION OF THE PREFERRED EMBODIMENTS

The preferred embodiments of the present invention are fully described hereinafter. The present invention comprises sequentially from the object side to the image side a first lens unit having positive refractive power, a second lens unit having negative refractive power, a third lens unit having positive refractive power, and a fourth lens unit having negative refractive power, and which accomplishes the zoom operation by varying the spacing between said various lens units. In the aforesaid zoom lens, each lens unit consists of at least a positive lens element and a negative lens element. This arrangement provides a compact zoom lens having a high zoom ratio and which corrects for distortion throughout the entire zooming range.

The following conditions must be satisfied to achieve the aforesaid compactness.

$$0.1 < BFw/Y' < 1.0 \tag{1}$$

BFw: back focal distance at the shortest focal length condition;

Y': one half the length of the diagonal picture plane

Condition (1) suitably prescribes the ratio between the back focal length of the shortest focal length condition, and ½ the length of the diagonal picture plane. When the upper limit of Condition (1) is exceeded, the back focal length becomes too long, thereby increasing the total length and making it difficult to achieve compactness. Conversely, when the lower limit of Condition (1) is exceeded, the back focal length becomes too short, a benefit of which is the reduction of the total length, but a disadvantage of which is the difficulty of achieving compactness in the diametral direction since the diameter of the fourth lens unit must be large to maintain illumination at the periphery of the picture plane.

The construction of each lens unit is described hereinafter, starting with the first lens unit.

The first lens unit preferably comprises sequentially from the object side to the image side a negative lens-positive lens construction. According to such an arrangement, the off-axial light passing through the negative lens enters the positive lens at an angle less than the entrance angle of the negative lens, such that correction of the off-axial light flux distortion is readily accomplished at the shortest focal length condition of the field angle.

The first lens unit desirably satisfies the following condition.

$$0.3 < f1/fT < 0.6 \qquad (2)$$

f1: focal length of the first lens unit;

fT: total focal length at the longest focal length condition

Condition (2) prescribed the ratio between the focal length of the longest focal length condition, and the focal length of the first lens unit. When the lower limit of Condition (2) is exceeded, positive distortion on the wide-angle side becomes considerable because the refractive power of the first lens unit becomes too strong, and the tendency of the spherical aberration on the telephoto side to fall to the underside becomes pronounced. Conversely, when the upper limit of Condition (2) is exceeded, negative distortion on the wide-angle side becomes considerable, and the tendency of the spherical aberration on the telephoto side to fall on the overside becomes pronounced.

Excellent optical qualities are obtained by using an aspherical surface within the first lens unit. The aspherical surface preferably satisfies the following condition relative to the optional height y in a direction perpendicular to the optical axis when the maximum effective optical path diameter of the aspherical surface is designated Ymax such that $0.5 < y < Ymax$.

$$-0.01 < \phi 1 \cdot (N' - N) \cdot \frac{d}{dy} \cdot [X(y) - X_0(y)] < 0.005 \qquad (3)$$

$\phi 1$: Refractive power of first lens unit

N: Refractive index of object side medium of aspherical surface

N': Refractive index of image side medium of aspherical surface

X(y): Surface configuration of aspherical surface $X_0(y)$: Reference spherical surface configuration of aspherical surface The values X(y) and $X_0(y)$ are expressed by the following equations.

$$X(y) = \frac{r}{\varepsilon} \cdot \left[1 - \left(1 - \varepsilon \cdot \frac{y^2}{r^2}\right)^{\frac{1}{2}}\right] + \sum_{i \geq 2} Ai y^i$$

-continued $$X_0(y) = \tilde{r} \cdot \left[1 - \left(1 - \varepsilon \cdot \frac{y^2}{\tilde{r}^2}\right)^{\frac{1}{2}}\right]$$

r: reference radius of curvature of aspherical surface $\varepsilon$: Conic constant Ai: Aspherical surface coefficient $\tilde{r}$: Paraxial radius of curvature of aspherical surface ($1/\tilde{r} = 1/r + 2A_2$)

Condition (3) is a condition for correcting and balancing spherical aberration on the telephoto side and off-axial distortion (particularly aberration) on the wide-angle side. When the lower limit of Condition (3) is exceeded, positive distortion occurs on the wide-angle side, and the tendency of the spherical aberration to fall to the underside on the telephoto side becomes pronounced. Conversely, when the upper limit of Condition (3) is exceeded, negative distortion occurs on the wide-angle side, and the tendency of the spherical aberration to fall to the overside on the telephoto side becomes pronounced.

The arrangement of the second lens unit is described hereinafter.

The second lens unit preferably comprises a negative lens element disposed on the furthermost object side, and a positive lens element disposed on the furthermost image side. This construction provides that the length of the back focal length can be readily set at a predetermined length, and coma and spherical aberration can be readily balanced and corrected throughout the entire zoom range.

The negative lens disposed on the furthermost object side preferably satisfies the following condition.

$$0.8 < (R1-R2)/(R1+R2) < 1.6 \qquad (4)$$

R1: radius of curvature of negative lens surface on the object side;

R2: radius of curvature of negative lens surface on the image side

Condition (4) is a condition for balancing and correcting spherical aberration and coma, and stipulates the configuration of the negative lens disposed on the furthermost object side. When the lower limit of Condition (4) is exceeded, there is a marked tendency for the spherical aberration to fall to the underside, and an inward coma is produced. Conversely, when the upper limit of Condition (4) is exceeded, there is a pronounced tendency for the spherical aberration to fall to the overside, and an outward coma is produced.

It is possible to produce a compact high-performance zoom lens when the second lens unit satisfies the following conditions.

$$0.05 < D2/fW < 0.40 \qquad (5)$$

$$0.01 < D2/fT < 0.08 \qquad (6)$$

D2: thickness of second lens unit in the direction of the optical axis;

fW: total system focal length at the shortest focal length condition

When the lower limits of Conditions (5) and (6) are exceeded, adequate distortion correction, and particularly color distortion correction, are difficult to achieve, e.g., even if correction can be accomplished, the optical system is nearly impossible to produce. Conversely, if the upper limit of conditions (5) and (6) are exceeded, the total length increases, and the diameter of the first lens unit increases because the entrance pupil is farther away.

Excellent optical properties are obtained by using an aspherical surface within the second lens unit.

The aspherical surface, preferably satisfies the following conditions relative to the optional height y in a direction perpendicular to the optical axis such that 0<y<Ymax.

$$-0.02 < \phi 2 \cdot (N' - N) \cdot \frac{d}{dy} \cdot [X(y) - X_0(y)] < 0.01 \qquad (7)$$

φ2: Refractive power of second lens unit

When the upper limit of Condition (7) is exceeded, the tendency for the spherical aberration to fall to the underside throughout the entire zoom range becomes pronounced, flaring of the off-axial light flux is considerable on the telephoto side, and outward coma is produced on the wide-angle side. Conversely, when the lower limit of Condition (7) is exceeded, there is a pronounced tendency for the spherical aberration to fall to the overside throughout the entire zoom range, there is a marked tendency for overcompensation of the flaring of the off-axial light flux, and inward coma is produced on the wide-angle side.

The aspherical surface is preferably provided on the lens on the furthermost object side, or on the lens of the furthermost image side. When an aspherical surface is provided on the furthermost object side lens, coma on the wide-angle side is readily correctable. Furthermore, when an aspherical lens is provided on the furthermost object side lens, spherical aberration is readily correctable. When both surfaces of the aforesaid aspherical lens are aspherical surfaces, spherical aberration, flare of off-axial light flux, and coma on the wide-angle side can be readily corrected and balanced. That is, that portion of spherical aberration, flare, and coma that are over-corrected or inadequately corrected by one aspherical surface can be corrected by the other aspherical surface. In such a case, it is desirable that both aspherical surfaces satisfy the previously mentioned conditions.

Furthermore, it is desirable that the second lens unit satisfy the following condition.

$$0.1 < |f2/fT| < 0.4 \qquad (8)$$

f2: focal length of second lens unit

Condition (8) prescribes the ratio between the total focal length of the entire system and the focal length of the second lens unit at the longest focal length condition. When the upper limit of Condition (8) is exceeded, the refractive power of the second lens unit is excessively weakened, such that the total length is increased in the shortest focal length condition, thereby increasing the shifting amount of the second lens unit during the zoom operation, and increasing the total length in the longest focal length condition. Conversely, when the lower limit of Condition (8) is exceeded, the refractive power of the second lens unit is excessively strengthened, such that inward coma is produced at the wide-angle side, which markedly increases the tendency of spherical aberration on the telephoto side to fall to the overside.

A compact, high-performance zoom lens is obtained when the third lens unit satisfies the following conditions.

$$0.05 < D3/fW < 0.40 \qquad (9)$$

$$0.01 < D3/fT < 0.08 \qquad (10)$$

D3: thickness of the third lens unit in the direction of the optical axis

When the lower limits of Conditions (9) and (10) are exceeded, adequate distortion correction, and particularly color distortion correction, are difficult to achieve, e.g., even if correction can be accomplished, the optical system is nearly impossible to produce. Conversely, if the upper limit of Conditions (9) and (10) are exceeded, the total length increases, and the diameter of the fourth lens unit increases because the exit pupil is farther away.

The third lens unit is described hereinafter.

Excellent optical properties are obtained by using an aspherical surface within the third lens unit. The aspherical surface preferably satisfies the following conditions relative to the optional height y in a direction perpendicular to the optical axis such that 0<y<Ymax.

$$-0.01 < \phi 3 \cdot (N' - N) \cdot \frac{d}{dy} \cdot [X(y) - X_0(y)] < 0.03 \qquad (11)$$

φ3: Refractive power of third lens unit

When the upper limit of Condition (11) is exceeded, there is a marked tendency for spherical aberration to fall to the underside throughout the zoom range, and inward coma is produced at the wide-angle side. Conversely, when the lower limit of Condition (11) is exceeded, there is a pronounced tendency for the spherical aberration to fall to the overside throughout the zoom range, and outward coma is produced at the wide-angle side.

The aspherical surface is preferably provided on either the outermost lens on the object side, or the outermost lens on the image side. When the aspherical surface is provided on the outermost lens on the object side, spherical aberration is readily correctable, whereas when said aspherical surface is provided on the outermost lens on the image side, coma is readily correctable.

It is desirable that the third lens unit satisfies the following condition.

$$0.1 < f3/fT < 0.17 \qquad (12)$$

f3: focal length of the third lens unit

Condition (12) prescribes the ratio between the total focal length and the focal length of the third lens unit in the longest focal length condition. When the upper limit of Condition (12) is exceeded, the refractive power of the third lens unit is excessively weakened, such that the total length is increased in the shortest focal length condition, thereby increasing the shifting amount of the third lens unit during the zoom operation, and increasing the total length in the longest focal length condition. Conversely, when the lower limit of Condition (12) is exceeded, the refractive power of the second lens unit is excessively strengthened, which markedly increases the tendency of spherical aberration on the telephoto side to fall to the overside.

It is desirable that the second lens unit and the third lens unit satisfy the following condition.

$$0.4 < M2/M3 < 0.9 \qquad (13)$$

M2: shifting amount of second lens unit in accordance with zoom from shortest focal length condition to longest focal length condition;

M3: shifting amount of third lens unit in accordance with zoom from shortest focal length condition to longest focal length condition Condition (13) prescribes the ratio between the shifting amounts of the second and third lens units in accordance with the zoom operation from the shortest focal length condition to the longest focal length condition. When the upper limit of Condition (13) is exceeded, the movement of the second and third lens units during the zoom operation are virtually identical, such that an effect similar to that of a three component type zoom lens system is unobtainable, and the scale of the optical system increases due to the increase in the shifting amounts of said lens units when trying to achieve a high zoom ratio. Conversely, when the lower limit of Condition (13) is exceeded, the difference in the shifting amounts of the second and third lens units increases, such that the spacing between said second and third lens units widens in the shortest focal length condition. Accordingly, the height of the on-axis light flux entering the third lens unit increases, making it difficult to correct for spherical aberration, and increasing the total length in the shortest focal length condition.

The fourth lens unit is described hereinafter.

The fourth lens unit comprises sequentially from the object side to the image side a positive lens and a negative lens, and has a back focal distance set at a minimum required limit. Furthermore, excellent optical properties can be ensured by providing an aspherical surface on any of the lens surfaces in the fourth lens unit. The aspherical surface preferably satisfies the following conditions relative to the optional height y in a direction perpendicular to the optical axis such that 0.5 Ymax<y<Ymax.

$$-0.05 < \phi 4 \cdot (N' - N) \cdot \frac{d}{dy} \cdot [X(y) - X_0(y)] < 0.01 \tag{14}$$

$\phi 4$: Refractive power of fourth lens unit

When the lower limit of Condition (14) is exceeded, there is a pronounced tendency of negative deviation of the curvature of field in the image plane and the negative distortion in the intermediate focal length range from the wide-angle side, and the spherical aberration falls to the underside on the telephoto side. Conversely, when the upper limit of Condition (14) is exceeded, there is a pronounced tendency of positive deviation of the curvature of field in the image plane and the positive distortion in the intermediate focal length range from the wide-angle side, and the spherical aberration falls to the overside on the telephoto side.

When aspherical surfaces are provided on both surfaces of the aforesaid aspherical lens, spherical aberration, distortion, and curvature of field in the image plane can be corrected and balanced. That is, that portion of spherical aberration, distortion, and curvature of field that are over-corrected or inadequately corrected by one aspherical surface can be corrected by the other aspherical surface.

It is desirable that the fourth lens unit satisfies the following condition.

$$0.1 < |f4/fT| < 0.3 \tag{15}$$

f4: focal length of the fourth lens unit

Condition (15) prescribes the ratio between the total focal length and the focal length of the fourth lens unit in the longest focal length condition. When the upper limit of Condition (15) is exceeded, the refractive power of the fourth lens unit is excessively weakened, such that the total length is increased in the shortest focal length condition. Conversely, when the lower limit of Condition (15) is exceeded, the refractive power of the fourth lens unit is excessively strengthened, such that positive distortion becomes pronounced, and the tendency for spherical aberration to fall to the overside on the telephoto side becomes greater.

It is desirable that in the dual aspherical surface lens both lens units satisfy the following condition:

$$0.05 < (dasp/Ymax) < 1.0 \tag{16}$$

dasp: axial distance of the dual aspherical surface lens

Ymax: maximum effective optical path diameter of the dual aspherical surface lens Condition (16) prescribes the ratio of the axial distance and the maximum effective optical path diameter of the lens having dual aspherical surfaces. When the lower limit of condition (16) is exceeded, the positions of the light flux transmitted through the anterior and posterior surfaces of a lens having dual aspherical surfaces are substantially the same, such that a distortion correction effect is unobtainable via the dual aspherical surfaces. Conversely, when the upper limit of Condition (16) is exceeded, the axial distance becomes excessive, such that compactness is lost and the optical system becomes larger in scale.

Specific numerical examples of the zoom lens of the present invention are provided below. In each of the following examples the first through fourth lens units all move toward the object side in conjunction with the zoom operation from the wide-angle side to the telephoto side. In each example, f expresses the total system focal length; ri (i=1, 2, 3, . . . ) expresses the radius of curvature of surface number i counting from the object side; di (i=1, 2, 3, . . . ) expresses axial distance of surface number I counting from the object side; Ni (i=1, 2, 3, . . . ) and vi (i=1, 2, 3, . . . ) respectively express the refractive index and Abbe number relative to the d line ($\lambda$=587.6 nm) of the lens number i counting from the object side. The surface labeled by the * mark attached to the radius of curvature is the surface comprising an aspherical surface.

The following embodiments comprise four lens units, which by simple construction are readily arranged in stationary or movable lens components having relatively weak refractive power between lens units and in the total system on the image side or the object side, and are included within the scope of the present invention.

| First Embodiment  f = 39.00 ~ 75.71 ~ 147.00  F No. = 4.08 ~ 6.50 ~ 9.10 | | | | | |
|---|---|---|---|---|---|
| Radius of Curvature | | Axial Distance | Refractive Index | | Abbe No. |
| r1 | 39.567 | d1 | 1.600 N1 | 1.84666 v1 | 23.82 |
| r2* | 28.745 | d2 | 0.500 | | |
| r3 | 23.831 | d3 | 5.000 N2 | 1.51680 v2 | 64.20 |
| r4 | 236.319 | d4 | 2.743 ~ 14.186 ~ 28.805 | | |
| r5* | −110.352 | d5 | 1.400 N3 | 1.75450 v3 | 51.57 |
| r6* | 13.192 | d6 | 0.700 | | |
| r7 | 13.699 | d7 | 4.100 N4 | 1.75520 v4 | 27.51 |
| r8* | 35.482 | d8 | 12.135 ~ 11.253 ~ 3.500 | | |
| r9 | diaphragm | d9 | 2.000 | | |
| r10 | 21.684 | d10 | 1.735 N5 | 1.84666 v5 | 23.82 |
| r11 | 13.536 | d11 | 0.500 | | |
| r12 | 14.715 | d12 | 4.700 N6 | 1.58170 v6 | 69.75 |
| r13* | −22.129 | d13 | 19.929 ~ 9.362 ~ 2.500 | | |
| r14* | −31.093 | d14 | 3.700 N7 | 1.84666 v7 | 23.82 |
| r15* | −21.416 | d15 | 3.300 | | |
| r16 | −13.530 | d16 | 1.302 N8 | 1.84666 v8 | 51.57 |
| r17 | −85.253 | | | | |

Aspherical surface coefficients r2

$\epsilon = 1.0000$
$A4 = 0.13363144 \times 10^{-5}$
$A6 = 0.21696985 \times 10^{-8}$
$A8 = 0.41553071 \times 10^{-10}$
$A10 = -0.34709861 \times 10^{-12}$
$A12 = 0.94512789 \times 10^{-15}$ r5

$\epsilon = 1.0000$
$A4 = 0.13911422 \times 10^{-4}$
$A6 = -0.31686841 \times 10^{-6}$
$A8 = 0.32534964 \times 10^{-9}$
$A10 = 0.19379817 \times 10^{-10}$
$A12 = -0.89500114 \times 10^{-13}$ r6

$\epsilon = 1.0000$
$A4 = 0.48478486 \times 10^{-4}$
$A6 = -0.13860097 \times 10^{-6}$
$A8 = -0.13541664 \times 10^{-8}$
$A10 = -0.10651014 \times 10^{-10}$
$A12 = 0.83922453 \times 10^{-12}$ r8

$\epsilon = 1.0000$
$A4 = -0.29662020 \times 10^{-6}$
$A6 = -0.12655499 \times 10^{-6}$
$A8 = 0.43355310 \times 10^{-8}$
$A10 = -0.33582316 \times 10^{-10}$
$A12 = -0.31881976 \times 10^{-12}$ r13

$\epsilon = 1.0000$
$A4 = 0.19979329 \times 10^{-4}$
$A6 = -0.13203504 \times 10^{-6}$
$A8 = -0.20524511 \times 10^{-8}$
$A10 = 0.14136961 \times 10^{-9}$
$A12 = -0.15575803 \times 10^{-11}$ r14

$\epsilon = 1.0000$
$A4 = 0.14324767 \times 10^{-4}$
$A6 = -0.35542636 \times 10^{-6}$
$A8 = 0.89405268 \times 10^{-8}$
$A10 = -0.50060441 \times 10^{-10}$
$A12 = 0.70672191 \times 10^{-13}$ r15

$\epsilon = 1.0000$
$A4 = -0.21286721 \times 10^{-4}$
$A6 = -0.96822952 \times 10^{-7}$
$A8 = 0.12781830 \times 10^{-8}$
$A10 = 0.24307208 \times 10^{-10}$
$A12 = -0.16466888 \times 10^{-12}$

Second Embodiment
$f = 39.00 \sim 87.31 \sim 195.01$
$F\text{ No.} = 4.12 \sim 7.00 \sim 8.71$

Figure 1:
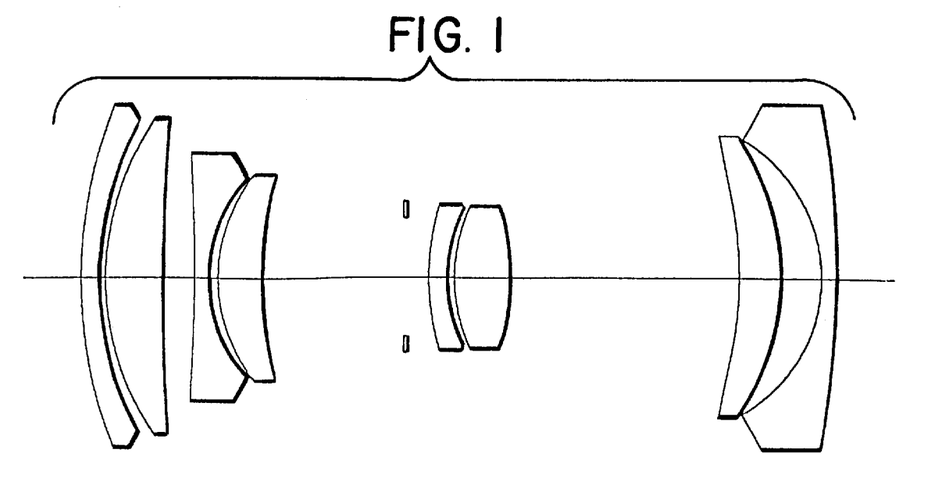
FIG. 1 is a cross-sectional view showing the lens arrangement of a first embodiment of the present invention.
Figure 2:
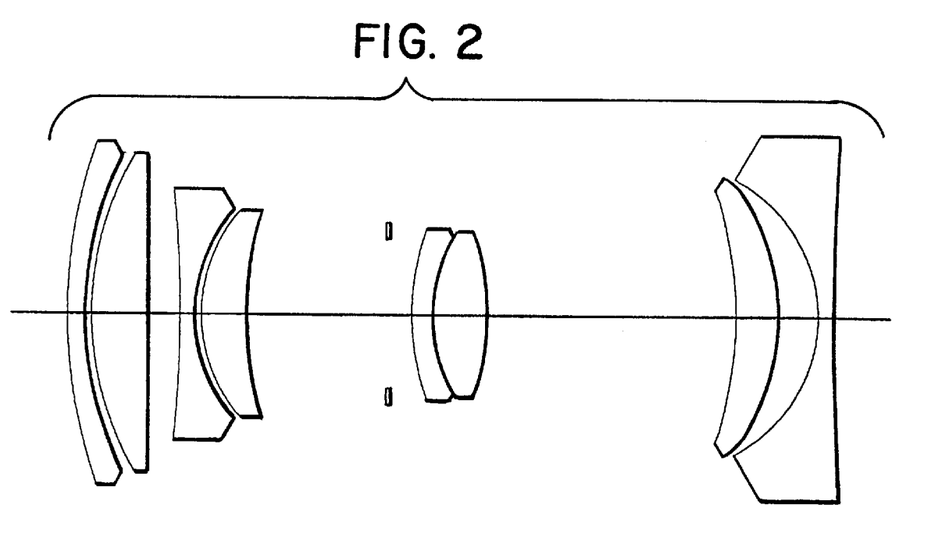
FIG. 2 is a cross-sectional view showing a second embodiment of the present invention.
Figure 3A:
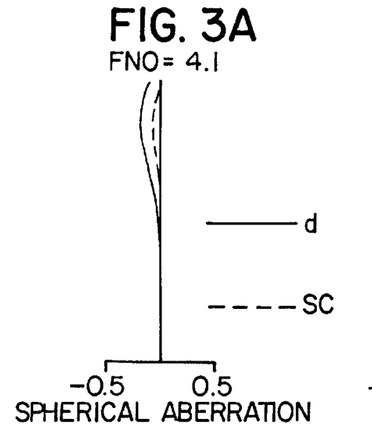
FIGS. 3A, 3B, and 3C show aberration curves of the first embodiment of the present invention.
Figure 3B:
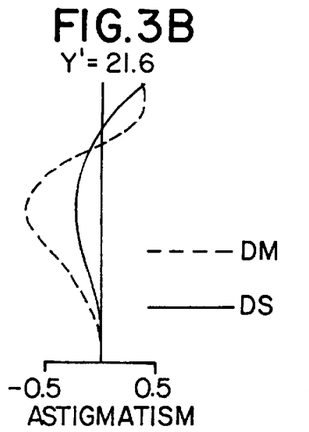
Figure 3C:
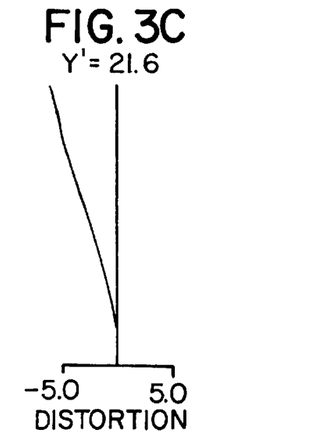
Figure 4A:
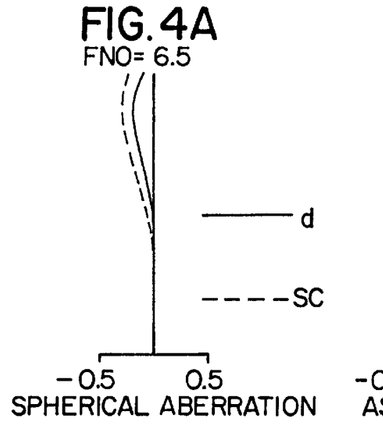
FIGS. 4A, 4B, and 4C show aberration curves of the first embodiment of the present invention.
Figure 4B:
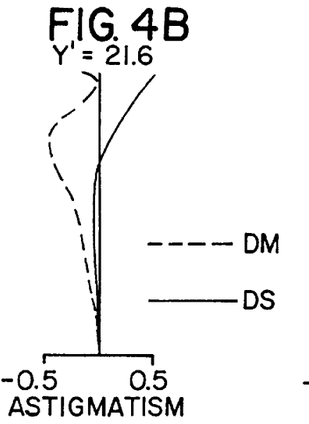
Figure 4C:
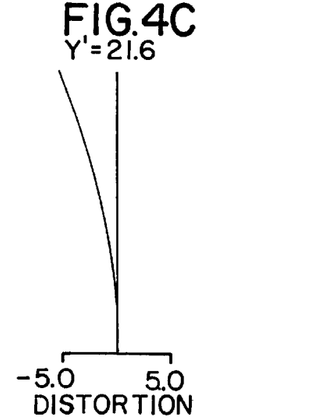
Figure 5A:
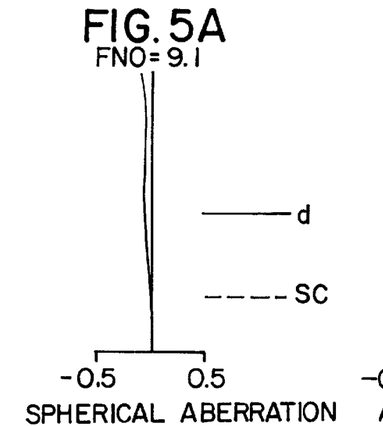
FIGS. 5A, 5B, and 5C show aberration curves of the first embodiment of the present invention.
Figure 5B:
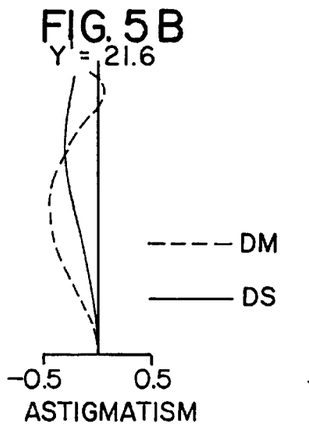
Figure 5C:
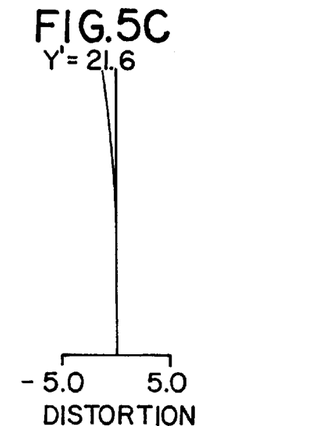
Figure 6A:
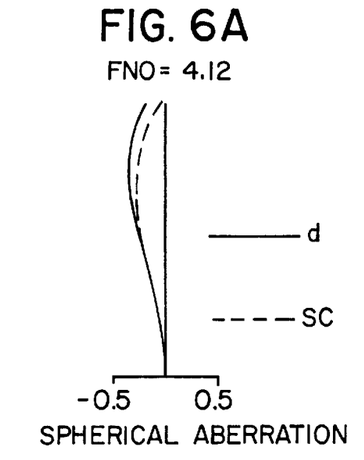
FIGS. 6A, 6B, and 6C show aberration curves of the second embodiment of the present invention.
Figure 6B:
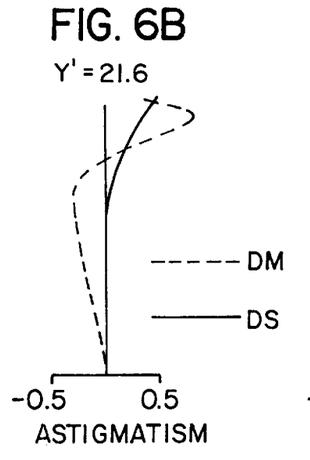
Figure 6C:
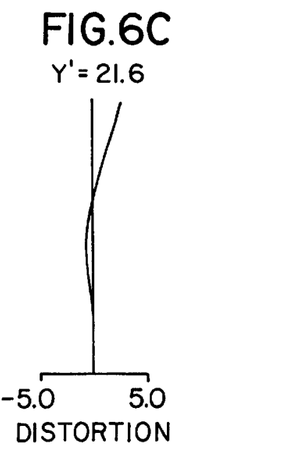
Figure 7A:
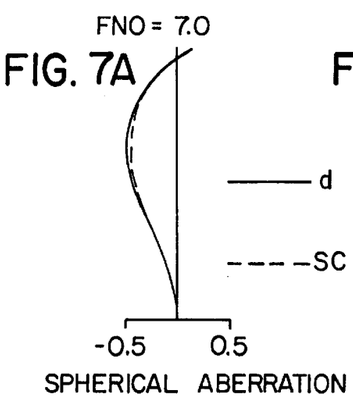
FIGS. 7A, 7B, and 7C show aberration curves of the second embodiment of the present invention.
Figures 7B, 7C:
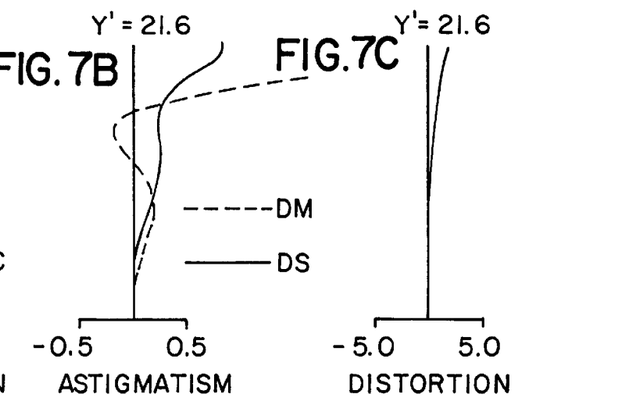
Figure 8A:
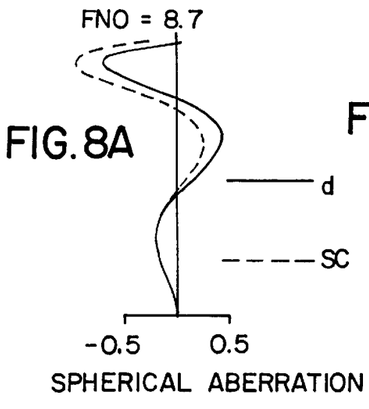
FIGS. 8A, 8B, and 8C show aberration curves of the second embodiment of the present invention.
Figures 8B, 8C:
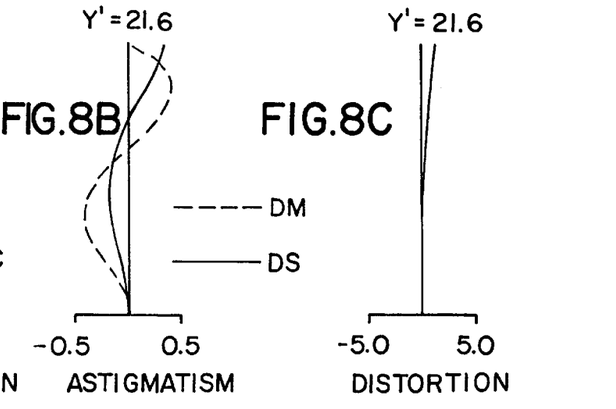

| | Radius of Curvature | | Axial Distance | Refractive Index | | Abbe No. |
|---|---|---|---|---|---|---|
| r1 | 43.064 | d1 | 1.600 | N1 | 1.84666 v1 | 23.82 |
| r2* | 30.102 | d2 | 0.500 | | | |
| r3 | 26.340 | d3 | 4.900 | N2 | 1.51680 v2 | 64.20 |
| r4 | −1163.833 | d4 | 2.742 ~ 19.626 ~ 33.566 | | | |
| r5* | −105.313 | d5 | 1.400 | N3 | 1.75450 v3 | 51.57 |
| r6* | 12.996 | d6 | 0.500 | | | |
| r7 | 13.123 | d7 | 4.100 | N4 | 1.75520 v4 | 27.51 |
| r8* | 36.601 | d8 | 12.000 ~ 10.500 ~ 4.500 | | | |
| r9 | diaphragm | d9 | 2.000 | | | |
| r10 | 20.886 | d10 | 1.735 | N5 | 1.84666 v5 | 23.82 |
| r11 | 13.193 | d11 | 0.200 | | | |
| r12 | 13.193 | d12 | 4.700 | N6 | 1.51728 v6 | 69.43 |
| r13* | −19.865 | d13 | 21.549 ~ 10.633 ~ 2.500 | | | |
| r14* | −30.109 | d14 | 3.700 | N7 | 1.84666 v7 | 23.82 |
| r15* | −20.094 | d15 | 3.300 | | | |
| r16 | −13.145 | d16 | 1.302 | N8 | 1.69680 v8 | 56.47 |
| r17 | 228.995 | | | | | |

Aspherical surface coefficients r2

$\epsilon = 1.0000$
$A4 = 0.69025647 \times 10^{-6}$
$A6 = 0.14043025 \times 10^{-7}$
$A8 = -0.19049568 \times 10^{-9}$
$A10 = 0.11857500 \times 10^{-11}$
$A12 = -0.25822737 \times 10^{-14}$ r5

$\epsilon = 1.0000$
$A4 = -0.45102200 \times 10^{-5}$
$A6 = 0.34414990 \times 10^{-7}$
$A8 = 0.42514041 \times 10^{-9}$
$A10 = -0.34989518 \times 10^{-11}$
$A12 = -0.27882475 \times 10^{-14}$ r8

$\epsilon = 1.0000$
$A4 = 0.14290715 \times 10^{-4}$
$A6 = 0.13326128 \times 10^{-6}$
$A8 = 0.38655876 \times 10^{-8}$
$A10 = -0.55498264 \times 10^{-11}$
$A12 = -0.33422664 \times 10^{-12}$ r13

$\epsilon = 1.0000$
$A4 = 0.16902968 \times 10^{-4}$
$A6 = 0.73362471 \times 10^{-6}$
$A8 = -0.18938922 \times 10^{-7}$
$A10 = 0.23201377 \times 10^{-9}$
$A12 = 0.11198367 \times 10^{-12}$ r14

$\epsilon = 1.0000$
$A4 = -0.15570861 \times 10^{-4}$
$A6 = 0.19006259 \times 10^{-6}$
$A8 = 0.72384221 \times 10^{-8}$
$A10 = -0.39306751 \times 10^{-10}$
$A12 = -0.20043219 \times 10^{-12}$ r15

$\epsilon = 1.0000$
$A4 = -0.35603483 \times 10^{-4}$
$A6 = -0.12213908 \times 10^{-6}$
$A8 = 0.73230932 \times 10^{-8}$
$A10 = -0.91360676 \times 10^{-11}$
$A12 = -0.28504659 \times 10^{-12}$ The values for the previously described conditions (excluding Conditions (3), (7), (11), and (14)) are indicated below for each embodiment. There are two values for Condition (16) in the first embodiment.

| Condition | Condition Range | First Embodiment | Second Embodiment |
|---|---|---|---|
| 1 | 0.1~1.0 | 0.42 | 0.30 |
| 2 | 0.3~0.6 | 0.58 | 0.43 |
| 4 | 0.8~1.6 | 1.27 | 1.28 |
| 5 | 0.05~0.40 | 0.16 | 0.16 |
| 6 | 0.01~0.08 | 0.04 | 0.03 |
| 8 | 0.1~0.4 | 0.23 | 0.19 |
| 9 | 0.05~0.40 | 0.18 | 0.17 |
| 10 | 0.01~0.08 | 0.05 | 0.03 |
| 12 | 0.1~0.5 | 0.16 | 0.13 |
| 13 | 0.4~0.9 | 0.84 | 0.77 |
| 15 | 0.1~0.3 | 0.21 | 0.13 |
| 16 | 0.05~1.0 | 0.14/0.33 | 0.33 |

The values for the previously described Conditions (3), (7), (11), and (14) are indicated below.

First Embodiment (1/2)

Aspherical surface

| Condition & Range | r2 (1st unit) (3) $-0.01 \sim 0.005$ | r5 (2nd unit) (7) $-0.02 \sim 0.01$ | r6 (2nd unit) (7) $-0.02 \sim 0.01$ | r8 (2nd unit) (7) $-0.02 \sim 0.01$ |
|---|---|---|---|---|
| 0.1 Ymax | — | $-0.211 \times 10^{-4}$ | $0.235 \times 10^{-5}$ | $-0.146 \times 10^{-7}$ |
| 0.2 Ymax | — | $-0.658 \times 10^{-4}$ | $0.186 \times 10^{-4}$ | $-0.202 \times 10^{-6}$ |
| 0.3 Ymax | — | $-0.658 \times 10^{-4}$ | $0.616 \times 10^{-4}$ | $-0.105 \times 10^{-5}$ |
| 0.4 Ymax | — | $-0.138 \times 10^{-3}$ | $0.142 \times 10^{-3}$ | $-0.325 \times 10^{-5}$ |
| 0.5 Ymax | $-0.186 \times 10^{-4}$ | $-0.232 \times 10^{-3}$ | $0.268 \times 10^{-3}$ | $-0.706 \times 10^{-5}$ |
| 0.6 Ymax | $-0.346 \times 10^{-4}$ | $-0.331 \times 10^{-3}$ | $0.443 \times 10^{-3}$ | $-0.116 \times 10^{-4}$ |
| 0.7 Ymax | $-0.593 \times 10^{-4}$ | $-0.432 \times 10^{-3}$ | $0.676 \times 10^{-3}$ | $-0.159 \times 10^{-4}$ |
| 0.8 Ymax | $-0.951 \times 10^{-4}$ | $-0.556 \times 10^{-3}$ | $0.102 \times 10^{-2}$ | $-0.269 \times 10^{-4}$ |
| 0.9 Ymax | $-0.147 \times 10^{-3}$ | $-0.760 \times 10^{-3}$ | $0.166 \times 10^{-2}$ | $-0.813 \times 10^{-4}$ |
| e1.0 Ymax | $-0.234 \times 10^{-3}$ | $-0.110 \times 10^{-2}$ | $0.318 \times 10^{-2}$ | $-0.299 \times 10^{-3}$ |

First Embodiment (2/2)

| Aspherical surface Condition & Range | r13 (3rd unit) (11) $-0.01 \sim 0.003$ | r14 (4th unit) (14) $-0.05 \sim 0.01$ | r15 (4th unit) (14) $-0.05 \sim 0.01$ |
|---|---|---|---|
| 0.1 Ymax | $-0.314 \times 10^{-6}$ | — | — |
| 0.2 Ymax | $-0.254 \times 10^{-5}$ | — | — |
| 0.3 Ymax | $-0.843 \times 10^{-5}$ | — | — |
| 0.4 Ymax | $-0.195 \times 10^{-4}$ | — | — |
| 0.5 Ymax | $-0.369 \times 10^{-4}$ | $-0.153 \times 10^{-3}$ | $-0.375 \times 10^{-3}$ |
| 0.6 Ymax | $-0.616 \times 10^{-4}$ | $-0.335 \times 10^{-3}$ | $-0.585 \times 10^{-3}$ |
| 0.7 Ymax | $-0.941 \times 10^{-4}$ | $-0.740 \times 10^{-3}$ | $-0.719 \times 10^{-3}$ |
| 0.8 Ymax | $-0.136 \times 10^{-3}$ | $-0.151 \times 10^{-2}$ | $-0.589 \times 10^{-3}$ |
| 0.9 Ymax | $-0.190 \times 10^{-3}$ | $-0.274 \times 10^{-2}$ | $-0.828 \times 10^{-4}$ |
| e1.0 Ymax | $-0.259 \times 10^{-3}$ | $-0.424 \times 10^{-2}$ | $-0.258 \times 10^{-3}$ |

Second Embodiment (1/2)

| Aspherical surface Condition & Range | r2 (1st unit) (3) $-0.01 \sim 0.005$ | r5 (2nd unit) (7) $-0.02 \sim 0.01$ | r8 (2nd unit) (7) $-0.02 \sim 0.01$ |
|---|---|---|---|
| 0.1 Ymax | — | $0.353 \times 10^{-6}$ | $0.498 \times 10^{-6}$ |
| 0.2 Ymax | — | $0.276 \times 10^{-5}$ | $0.415 \times 10^{-5}$ |
| 0.3 Ymax | — | $0.869 \times 10^{-5}$ | $0.147 \times 10^{-4}$ |
| 0.4 Ymax | — | $0.182 \times 10^{-4}$ | $0.375 \times 10^{-4}$ |
| 0.5 Ymax | $-0.121 \times 10^{-4}$ | $0.289 \times 10^{-4}$ | $0.813 \times 10^{-4}$ |
| 0.6 Ymax | $-0.213 \times 10^{-4}$ | $0.353 \times 10^{-4}$ | $0.161 \times 10^{-3}$ |
| 0.7 Ymax | $-0.344 \times 10^{-4}$ | $0.299 \times 10^{-4}$ | $0.298 \times 10^{-3}$ |
| 0.8 Ymax | $-0.540 \times 10^{-4}$ | $0.886 \times 10^{-5}$ | $0.523 \times 10^{-3}$ |
| 0.9 Ymax | $-0.844 \times 10^{-4}$ | $-0.140 \times 10^{-4}$ | $0.864 \times 10^{-3}$ |
| 1.0 Ymax | $-0.119 \times 10^{-3}$ | $-0.234 \times 10^{-4}$ | $0.131 \times 10^{-2}$ |

Second Embodiment (2/2)

| Aspherical surface Condition & Range | r13 (3rd unit) (11) $-0.01 \sim 0.003$ | r14 (4th unit) (14) $-0.05 \sim 0.01$ | r15 (4th unit) (14) $-0.05 \sim 0.01$ |
|---|---|---|---|
| 0.1 Ymax | $-0.356 \times 10^{-6}$ | — | — |
| 0.2 Ymax | $-0.310 \times 10^{-5}$ | — | — |
| 0.3 Ymax | $-0.115 \times 10^{-4}$ | — | — |
| 0.4 Ymax | $-0.310 \times 10^{-4}$ | — | — |
| 0.5 Ymax | $-0.646 \times 10^{-4}$ | $-0.172 \times 10^{-4}$ | $-0.664 \times 10^{-3}$ |
| 0.6 Ymax | $-0.120 \times 10^{-3}$ | $-0.369 \times 10^{-3}$ | $-0.778 \times 10^{-3}$ |
| 0.7 Ymax | $-0.203 \times 10^{-3}$ | $-0.115 \times 10^{-2}$ | $-0.528 \times 10^{-3}$ |
| 0.8 Ymax | $-0.323 \times 10^{-3}$ | $-0.218 \times 10^{-2}$ | $-0.199 \times 10^{-3}$ |
| 0.9 Ymax | $-0.500 \times 10^{-3}$ | $-0.195 \times 10^{-2}$ | $-0.229 \times 10^{-2}$ |
| 1.0 Ymax | $-0.796 \times 10^{-3}$ | $-0.449 \times 10^{-2}$ | $-0.158 \times 10^{-1}$ |

In a zoom lens system which has a positive lens unit, a negative second lens unit having an aspherical surface, a positive third lens unit having an aspherical surface, and a negative fourth lens unit, it is desirable that the zoom lens system satisfies the following conditions:

$$0.05 < (T23w - T23t)/fw < 0.40 \tag{17}$$

$$1.4 < \beta 3w/\beta 3t < 4.0 \tag{18}$$

T23w is a distance between the second lens unit and the third lens unit at the shortest focal length condition.

T23t is a distance between the second lens unit and the third lens unit at the longest focal length condition.

fw is a total system focal length at the shortest focal length condition.

β3w is a lateral magnification of the third lens unit at the shortest focal length condition.

β3t is a lateral magnification of the third lens unit at the longest focal length condition.

The value (T23w−T23t)/fw of Condition (17) shows the ratio of changing amount of the distance between the second lens unit and third lens unit in accordance with zoom from the shortest focal length condition to the longest focal length condition, to total system focal length at the shortest focal length condition. The value, β3w/β3t of Condition (18), shows lateral magnification of the third lens unit in accordance with zoom from the shortest focal length condition to the longest focal length condition. The values of both Condition (17) and Condition (18) relate to the ratio of the contribution of the third lens unit to zooming throughout the entire zoom range.

When the lower limit of either Condition (17) or (18) is exceeded, the contribution of the third lens unit to zooming decreases, such that the total length of the zoom lens system increases, and the shifting amount of each lens unit increases during zooming, which is disadvantageous for the design of a lens barrel holding the zoom lens system. Conversely, when the upper limit of either Conditions (17) or (18) is exceeded, the contribution of the third lens unit to zooming increases, such that correction of the aberration becomes difficult.

The value of both Condition (17) and (18) for each embodiment is indicated hereinbelow.

| Condition | Condition Range | First Embodiment | Second Embodiment |
|---|---|---|---|
| 17 | 0.05–0.40 | 0.22 | 0.19 |
| 18 | 1.4–4.0 | 1.71 | 2.68 |

The invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description, and all changes, which come within the meaning and range of equivalency of the claims are therefore intended to be embraced therein.

What is claimed is:

1. A zoom lens system comprising, from the object side to the image side:

a positive first lens unit;

a negative second lens unit;

a positive third lens unit; and a negative fourth lens unit;

and wherein air spaces between each lens unit vary during a zoom operation, and the zoom lens system fulfills the following conditions:

0.1<BFW/Y'<1.0

0.4<M2/M3<0.9

0.01<D3/fT<0.08 wherein:

BFW: back focal distance at the shortest focal length condition;

Y': one-half the length of the diagonal picture plane;

M2: the shifting amount of the second lens unit in accordance with zoom from the shortest focal length condition to the longest focal length condition;

M3: the shifting amount of the third lens unit in accordance with zoom from the shortest focal length condition to the longest focal length condition;

D3: the thickness of the third lens unit in the direction of the optical axis; and fT: the total focal length at the longest focal length condition.

2. A zoom lens system comprising, from the object side to the image side:

a positive first lens unit;

a negative second lens unit having an aspherical surface;

a diaphragm;

a positive third lens unit having an aspherical surface; and a negative fourth lens unit, wherein airspace between each lens unit varies during zooming, and wherein the zoom lens fuls the following condition:

$-0.02 < \phi 2 \cdot (N'-N) \cdot d/dy \cdot \{x(y)-x_0(y)\} < 0.01$ wherein:

$\phi 2$: the refractive power of the second lens unit;

N': the refractive index of the image side medium of the aspherical surface of the second lens unit;

N: the refractive index of the object side medium of the aspherical sure of the second lens unit;

x(y): the surface configuration of the aspherical surface of the second lens unit; and $x_0(y)$: the reference spherical surface configuration of the aspherical surface of the second lens unit;

the values x(y) and $x_0(y)$ are expressed by the following equations:

$$x(y) = \frac{r}{\varepsilon} \cdot \left[1 - \sqrt{1 - \varepsilon \cdot \frac{y^2}{r^2}}\right] + \sum_{i \geq 2} Ai \cdot y^i$$

$$x_0(y) = \bar{r} \cdot \left[1 - \sqrt{1 - \varepsilon \cdot \frac{y^2}{\bar{r}^2}}\right]$$

wherein:

y: the height of the aspherical surface in the direction perpendicular to the optical axis;

r: the reference radius of curvature of the aspherical surface;

$\varepsilon$: the conic constant;

Ai: the aspherical surface coefficient; and $\bar{r}$: the paraxial radius of curvature of the aspherical surface ($1/\bar{r}=1r+2A_2$).

3. A zoom lens system as claimed in claim 2, wherein the zoom lens system fulfills the following condition:

0.1<|f2/fT|<0.4 wherein:

f2: the focal length of the second lens unit; and fT: the total system focal length at the longest focal length condition.

4. A zoom lens system comprising, from the object side to the image side:

a positive first lens unit;

a negative second lens unit having an aspherical surface;

a diaphragm;

a positive third lens unit having an aspherical surface; and a negative fourth lens unit, wherein airspace between each lens unit varies during zooming; and wherein the zoom lens system fulfills the following condition:

$$-0.01 < \phi 3 \cdot (N' - N) \cdot \frac{d}{dy} \cdot [x(y) - x_0(y)] < 0.03$$

wherein:

$\phi 3$: the refractive power of the third lens unit;

N': the refractive index of the image side medium of the aspherical surface of the third unit;

N: the refractive index of the object side medium of the aspherical surface of the third unit;

x(y): the surface configuration of the aspherical surface of the third unit; and $x_0(y)$ the reference spherical surface configuration of the aspheﬁcal surface of the third unit;

the values x(y) and $x_0$ are expressed by the following equations:

$$x(y) = \frac{r}{\varepsilon} \cdot \left[1 - \sqrt{1 - \varepsilon \cdot \frac{y^2}{r^2}}\right] + \sum_{i \geq 2} Ai \cdot y^i$$

$$x_0(y) = \bar{r} \cdot \left[1 - \sqrt{1 - \varepsilon \cdot \frac{y^2}{\bar{r}^2}}\right]$$

wherein:
y: the height of the aspherical surface in the direction perpendicular to the optical axis;
r: the reference radius of curvature of the aspherical surface;
$\varepsilon$: the conic constant;
Ai: the aspherical surface coefficient; and
$\bar{r}$: the paraxial radius of curvature of the aspherical surface $$\left(\frac{1}{\bar{r}} = \frac{1}{r} + 2A_2\right).$$

5. A zoom lens system as claimed in claim 4, wherein the zoom lens system fulfills the following condition:

0.1<f3/fT<0.17 wherein:
f3: the focal length of the third lens unit;
fT: the total focal length at the longest focal lendt condition.

6. A zoom lens system comprising, from the object side to the image side:
a positive first lens unit;
a negative second lens unit having an aspherical surface;
a positive third lens unit having an aspherical surface; and
a negative fourth lens unit;
and wherein air space between each lens unit varies during a zooming operation, and wherein the zoom lens system fulfills the following condition:

0.05<(T23w−T23t)/fw<0.40 wherein:
T23w: the distance between the second lens unit and the third lens unit at the shortest focal length condition;
T23t: the distance between the second lens unit and the third lens unit at the longest focal length condition;
fw: the total system focal length at the shortest focal length condition.

7. A zoom lens system comprising, from the object side to the image side:
a positive first lens unit, the positive first lens unit being moved during a zooming operation;
a negative second lens unit having an aspherical surface;
a positive third lens unit having an aspherical surface; and
a negative fourth lens unit;
and wherein air space between each lens unit varies during the zooming operation, and wherein the zoom lens system fulfills the following condition:

1.4<β3w/β3t<4.0 wherein:
β3w: the lateral magnification of the third lens unit at the shortest focal length condition; and
β3t: the lateral magnification of the third lens unit at the longest focal length condition.

8. A zoom lens system comprising, from the object side to the image side:
a positive first lens unit;
a negative second lens unit having an aspherical surface;
a positive third lens unit having an aspherical surface; and
a negative fourth lens unit,
and wherein air spaces between each lens unit vary during a zoom operation, and the zoom lens system films the following conditions:

$$0.1 < \frac{BFW}{Y'} < 1.0$$

$$-0.02 < \phi 2 \cdot (N' - N) \cdot \frac{d}{dy} \cdot \{x(y) - x_0(y)\} < 0.01$$

wherein:
BFW: back focal distance at the shortest focal length condition;
Y': one-half the length of the diagonal picture plane;
$\phi 2$: the refractive power of the second lens unit;
N': the refractive index of the image side medium of the aspherical surface of the second lens unit;
N: the refractive index of the object side medium of the aspherical surface of the second lens unit;
x(y): the surface configuration of the aspherical surface of the second lens unit; and
$x_0(y)$: the reference spherical surface configuration of the aspherical surface of the second lens unit;
the values x(y) and $x_0(y)$ are expressed by the following equations:

$$x(y) = \frac{r}{\varepsilon} \cdot \left[1 - \sqrt{1 - \varepsilon \cdot \frac{y^2}{r^2}}\right] + \sum_{i \geq 2} Ai \cdot y^i$$

$$x_0(y) = \bar{r} \cdot \left[1 - \sqrt{1 - \varepsilon \cdot \frac{y^2}{\bar{r}^2}}\right]$$

wherein:
y: the height of the aspherical source in the direction perpendicular to the optical axis;
r: the reference radius of curvature of the aspherical surface;
$\varepsilon$: the conic constant;
Ai: the aspherical surface coefficient; and
$\bar{r}$: the paraxial radius of curvature of the aspherical surface $$\left(\frac{1}{\bar{r}} = \frac{1}{r} + 2A_2\right).$$

9. A zoom lens system as claimed in claim 8, wherein the zoom lens system fulfills the following condition:

0.1<f2/fT<0.4 wherein:
f2: the focal length of the second lens unit;
fT: the total focal length at the longest focal length condition.

10. A zoom lens system comprising, from the object side to the image side:

a positive first lens unit;

a negative second lens unit having an aspherical surface;

a positive third lens unit having an aspherical surface; and a negative fourth lens unit;

and wherein air spaces between each lens unit vary during a zoom operation, and the zoom lens system fulfills the following conditions:

$$0.1 < \frac{BFW}{Y^1} < 1.0$$

$$-0.01 < \phi 3 \cdot (N^1 - N) \cdot \frac{d}{dy} \cdot \{x(y) - x_0(y)\} < 0.03$$

wherein:

BFW: back focal distance at the shortest focal length condition;

$Y^1$: one-half the length of the diagonal picture plane;

$\phi 3$: the refractive power of the third lens unit;

N': the refractive index of the image side medium of the aspherical surface of the third lens unit;

N: the refractive index of the object side medium of the aspherical surface of the third lens unit;

x(y): the surface configuration of the aspherical surface of the third lens unit; and $x_0(y)$: the reference spherical surface configuration of the aspherical surface of the third lens unit;

the values x(y) and $x_0(y)$ are expressed by the following equations:

$$x(y) = \frac{r}{\varepsilon} \cdot \left[ 1 - \sqrt{1 - \varepsilon \cdot \frac{y^2}{r^2}} \right] + \sum_{i \geq 2} Ai \cdot y^i$$

$$x_0(y) = \bar{r} \cdot \left[ 1 - \sqrt{1 - \varepsilon \cdot \frac{y^2}{\bar{r}^2}} \right]$$

wherein:

y: the height of the aspherical surface in the direction perpendicular to the optical axis;

r: the reference radius of curvature of the aspherical surface;

$\varepsilon$: the conic constant;

Ai: the aspherical surface coefficient; and $\bar{r}$: the paraxial radius of curvature of the aspherical surface.

$$\left( \frac{1}{\bar{r}} = \frac{1}{r} + 2A_2 \right).$$

11. A zoom lens system as claimed in claim 10, wherein the zoom lens system fulfills the following condition:

0.1 < f3/fT < 0.17 wherein:

f3: the focal length of the third lens unit;

fT: the total focal length at the longest focal length condition.

* * * * *